United States Patent
Nguyen et al.

(10) Patent No.: US 10,417,244 B2
(45) Date of Patent: Sep. 17, 2019

(54) JUST-IN-TIME COMPUTATION IN A FEDERATED SYSTEM

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 837 days.

(21) Appl. No.: 14/493,045

(22) Filed: Sep. 22, 2014

(65) Prior Publication Data
US 2016/0085828 A1    Mar. 24, 2016

(51) Int. Cl.
- *G06F 16/00* (2019.01)
- *G06F 16/2458* (2019.01)
- *G06F 16/2455* (2019.01)
- *G06F 16/2452* (2019.01)

(52) U.S. Cl.
CPC ...... *G06F 16/2471* (2019.01); *G06F 16/2452* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 5,473,690 | A * | 12/1995 | Grimonprez | G06Q 20/341 235/380 |
| 7,139,821 | B1 * | 11/2006 | Shah | G06F 8/61 709/203 |
| 7,734,576 | B2 | 6/2010 | Simon et al. | |
| 7,859,544 | B2 | 12/2010 | Okada | |
| 7,877,381 | B2 | 1/2011 | Ewen et al. | |
| 8,171,057 | B2 | 5/2012 | Short et al. | |
| 8,250,583 | B2 | 8/2012 | Grasselt et al. | |
| 2001/0051949 | A1 * | 12/2001 | Carey | G06F 17/3041 |
| 2004/0034683 | A1 | 2/2004 | Zhao | |
| 2005/0021502 | A1 | 1/2005 | Chen et al. | |
| 2006/0265702 | A1 * | 11/2006 | Isaacson | G06F 8/61 717/168 |

(Continued)

OTHER PUBLICATIONS

Bart Jacob, Surrey Mui, Jatinder Pannu, Sungsim Park, Hugues Raguet, Jack Schneider, Laurent Vanel, on Demand Operating Environment: Creating Business Flexibility, Apr. 2004, 260 pages, retrieved from http://www.redbooks.ibm.com/redbooks/pdfs/sg246633.pdf on Sep. 22, 2014.

(Continued)

*Primary Examiner* — Paul Kim
(74) *Attorney, Agent, or Firm* — Haynes and Boone, LLP

(57) ABSTRACT

An example method for processing a federated query includes determining, at a data federation tool, a source query embedded in a federated query. The source query includes a name of a table and one or more conditions for selecting data from the table. The method also includes sending, at the data federation tool, a request to compile a software package in accordance with a view description of the table to a data slave. The software package includes a set of source files and is associated with the table. The method further includes sending the source query to the data slave and receiving, at the data federation tool, the result of the source query from the data slave.

16 Claims, 6 Drawing Sheets

(56) References Cited

U.S. PATENT DOCUMENTS

2013/0086039 A1* 4/2013 Salch ............... G06F 17/30463
707/717

OTHER PUBLICATIONS

Consult Solutions + Value, copyrighted 2013, 59 pages, retrieved from http://www.consolut.com/en/s/sap-ides-access/d/s/doc/YB-production_version on Sep. 22, 2014.

Ricardo Fortuna Raminhos, ETL—State of the Art, Apr. 2007, 198 pages, Department of Computer Science, Universidade Nova de Lisboa http://ricardoraminhos.com/wp-content/uploads/2007/07/RFR_ETL_State_of_the_Art.pdf on Sep. 22, 2014.

Spotfire Data Federation, 4 pages, retrieved from http://semanticommunity.info/Build_DoD_in_the_Cloud/Enterprise_Information_Web_for_Semantic_Interoperability_at_DoD/Spotfire_Data_Federation on Sep. 22, 2014.

* cited by examiner

JUST-IN-TIME COMPUTATION IN A FEDERATED SYSTEM

FIELD OF DISCLOSURE

The present disclosure generally relates to federated systems, and more specifically to generating data just-in-time for data retrieval in a federated system.

BACKGROUND

A Service-Oriented Architecture (SOA) may create services for retrieving data. Data federation can leverage such services because it can access different types of data sources (e.g., web-based services out of the box, flat files, or Java EE Connector Architecture (JCA) components). A federated system is a collection of cooperating but autonomous data sources belonging to a federation. The autonomous data sources belonging to the federation cooperate with each other yet maintain some degree of autonomy. A federated system allows a client to send requests to multiple data sources with the use of a single federated query. A federated query is a query that contains several source queries, and each source query may be specific to a data source. A source query that is specific to a data source is written in a format that is understandable by the data source and may be executable at the data source.

In a federated system, a federated server may receive a federated query from the client and send each source query embedded in the federated query to the appropriate data source for execution. When a client submits a federated query, the federated server may return a result of the federated query to the client by retrieving results from the applicable data sources.

In a federated system, a single federated query can result in data being extracted from a plurality of data sources. These data sources may be of a very different nature, ranging from relational database management systems (RDBMs) and spreadsheets to unstructured data sources such as NoSQL (non-Standard Query Language) databases and flat files. A federated query may be complicated and time consuming to process, especially one that generates a large amount of data. Additionally, it may be time consuming for the federated server to wait for each of the data sources to respond to a source query.

BRIEF SUMMARY

Methods, systems, and techniques for processing a federated query are provided.

According to some embodiments, a method of processing a federated query includes determining, at a data federation tool, a source query embedded in a federated query. The source query includes a name of a table and one or more conditions for selecting data from the table. The method also includes sending, at the data federation tool, a request to a data slave to compile a software package in accordance with a view description of the table. The software package includes a set of source files and is associated with the table. The method further includes sending the source query to the data slave. The method also includes receiving, at the data federation tool, the result of the source query from the data slave.

According to some embodiments, a system for processing a federated query includes a data federation engine that receives a federated query including one or more embedded source queries and receives a result of each of the one or more embedded source queries. A source query includes a name of a table and one or more conditions for selecting data from the table. The system also includes a federated distributor that sends a request to a data slave to compile a software package in accordance with a view description of a table and sends the source query to the data slave. The software package includes a set of source files and is associated with the table.

According to some embodiments, a non-transitory machine-readable medium including a plurality of machine-readable instructions that when executed by one or more processors is adapted to cause the one or more processors to perform a method including: determining, at a data federation tool, a source query embedded in a federated query, the source query including a name of a table and one or more conditions for selecting data from the table; sending, at the data federation tool, a request to a data slave to compile a software package in accordance with a view description of the table, the software package including a set of source files and associated with the table; sending the source query to the data slave; and receiving, at the data federation tool, the result of the source query from the data slave.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
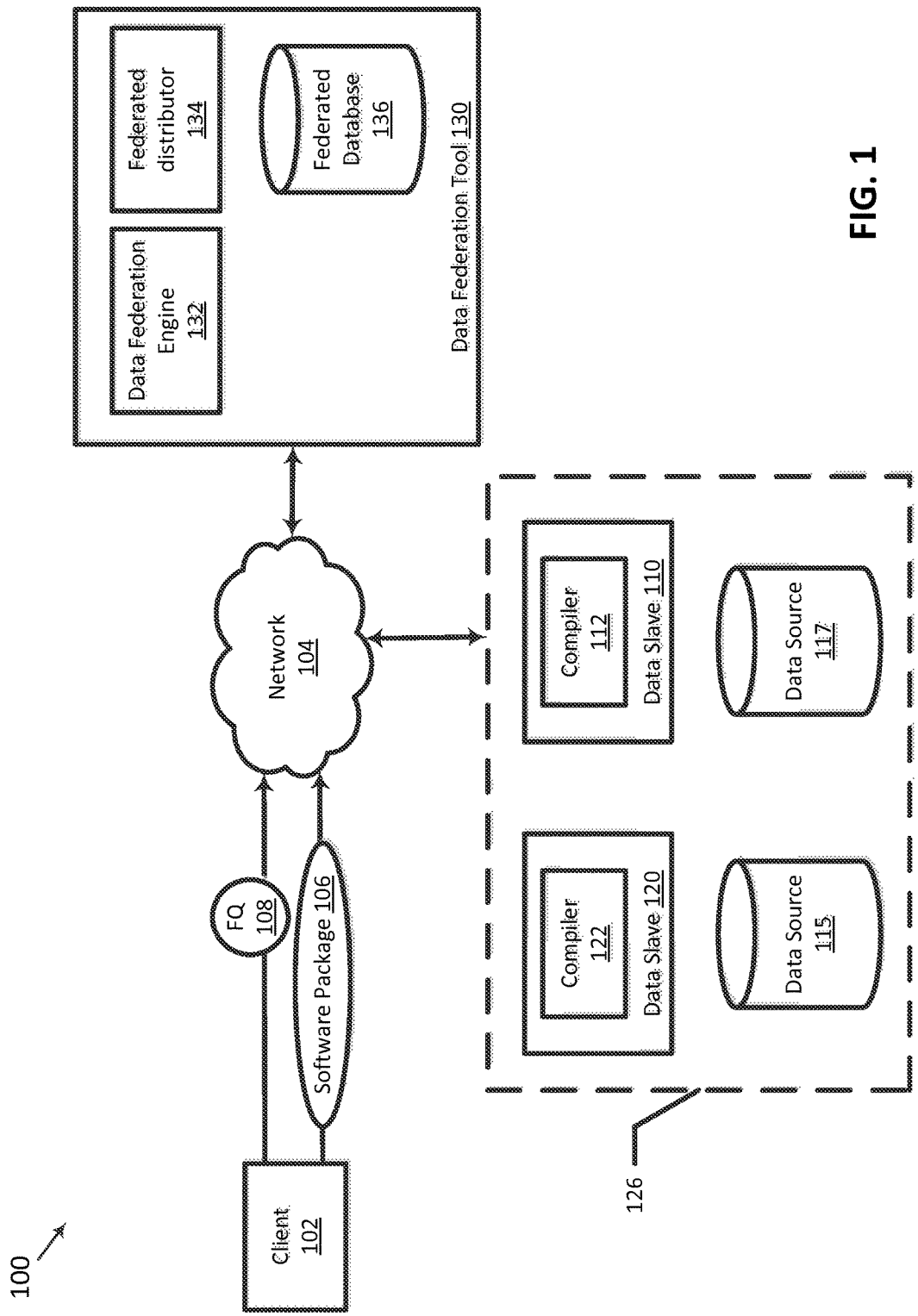
FIG. 1 is a block diagram illustrating a federated system for processing a federated query, according to some embodiments.

Embodiments of the present disclosure and their advantages are best understood by referring to the detailed description that follows.

DETAILED DESCRIPTION

I. Overview
II. Example System Architecture
   A. Upload Software Package to Data Federation Tool
   B. Federated Queries Having Embedded Source Queries
III. Example Method
IV. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A target data source may refer to a data source to which a query is to be sent. It may take a lot of computational power and time to generate and retrieve some of the data in a federated system. For example, it may take a lot of computational power and time to generate and retrieve prime numbers or key pairs for asymmetric cryptography. In such instances, rather than retrieve this data from an actual database table that is stored on disk or a hardware drive, it may be desirable to generate data on-the-fly for a table view and then query the table view for results.

The present disclosure provides techniques to efficiently perform data generation and retrieval in the context of data federation. In some embodiments, a system for processing a federated query includes a data federation tool including a data federation engine and a federated distributor. A client may upload one or more software packages to the data federation tool, and the federated distributor may store the software package in a database. A software package includes a set of source files that performs an operation.

A view description corresponds to a software package and may be created by an administrator. A view description is a description of a table view may be used to create the table view. In an example, the view description includes the name of the table view, a set of input column names of the table view, and a set of output column names of the table view. The view description may specify inputs and outputs of the operation performed by the associated software package.

The data federation engine receives a federated query from a client. A federated query includes one or more embedded source queries, where a source query includes a name of a table and one or more conditions for selecting data from the table. The federated distributor selects a data source to process the source query and a result of the source query is returned to the data federation engine. The source query may be submitted against a table view that is not stored on disk or a hardware drive or may be submitted against an actual database table that is stored on disk or a hardware drive.

In an example, the table to which the source query is submitted is a table view. In this example, the data source may be referred to as a data slave. Federated distributor may select a data slave belonging to a data federation and send a request to the selected data slave, where the request includes the software package and the view description of the table view associated with the software package. The request may be a request to compile the software package in accordance with the view description of the table. The data slave receives the request and compiles the software package in accordance with the view description of the table. In an example, the data slave compiles the software package, creates a table view in accordance with the view description, and generates data on-the-fly for the table view. The federated distributor also sends the source query to the data slave. The data slave submits the source query against the table view, which is populated with the on-the-fly data, retrieves a result of the source query, and returns the result to the data federation engine.

In another example, the table to which the source query is submitted is an actual database table. In this example, federated distributor may select a data source belonging to the data federation and submit the source query to the selected data source, which stores the actual database table. The selected data source submits the source query against the table, retrieves a result of the source query, and returns the result to the data federation engine.

The data federation engine may submit each of the source queries embedded in a federated query to a data source for processing and receive a result back from each of the data sources. The data federation engine may pack each of the results into a final result, which the data federation engine sends to the client.

Unless specifically stated otherwise, as apparent from the following discussion, it is appreciated that throughout the description, discussions using terms such as "determining", "sending", "receiving", "identifying", "selecting", and "storing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

II. Example System Architecture

FIG. 1 is a block diagram illustrating a federated system 100 for processing a federated query 108, according to some embodiments. System 100 includes a client 102, data slaves 110 and 120, data sources 115 and 117, and data federation tool 130 coupled via a network 104.

Network 104 may be, for example, a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, WANs, LANs, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing. Although one client and two data slaves are illustrated, this is not intended to be limiting, and system 100 may include one or more clients and one or more data slaves.

Client 102 may be a personal computer (PC), workstation, mobile device (e.g., a mobile phone, personal digital assistant (PDA), tablet, and laptop), game console, set-top box, kiosk, embedded system, or other device having at least one processor and memory. Client 102 may also be an application run on a PC, server, database, etc. Additionally, client 102 may be a fat client (e.g., a client that performs local processing and data storage), a thin client (e.g., a client that performs minimal or no local processing and minimal to no data storage), and/or a hybrid client (e.g., a client that performs local processing but little to no data storage).

Data federation tool 130 includes a data federation engine 132, federated distributor 134, and federated database 136. Data federation tool 130 may be a single machine or may include multiple interconnected machines (e.g., machines configured in a cluster). Data federation engine 132 and federated distributor 134 may execute on a computing device having at least one processor and memory.

Each of data source 115, data source 117, data slave 110, and data slave 120 is a computing device that is remote from data federation tool 130 and belongs to a data federation 126. Data sources 115 and 117 and data slaves 110 and 120 may execute on a computing device having at least one processor and memory. Data sources 115 and 117 may be external systems that store data accessible over network 104. In an example, data sources 115 and 117 are heterogeneous data sources that accept different query formats relative to each other. In an example, data source 115 is an ORACLE® database provided by ORACLE®, and data source 117 is a DB2® database provided by IBM®. Trademarks are the properties of their respective owners. In another example, data source 115 is an ORACLE® database, and data source 117 is a web service.

Data slave 110 includes a compiler 112, and data slave 120 includes a compiler 122. In some embodiments, rather than compile source code at data federation tool 130, data federation tool 130 sends source code to a selected data slave to compile. Data federation tool 130 may select a data slave and send it instructions to generate data for a table view. In this way, a data slave may be considered a data source from which data results of a query are retrieved. The data slave generates binary code based on compiling the source code and executes the binary code to perform one or more operations that generate the data for the table view. The data slave may generate the data for the table view on-the-fly, execute a source query against the table view, and return results of the source query to the data federation tool.

A. Upload Software Package to Data Federation Tool

Figure 2:
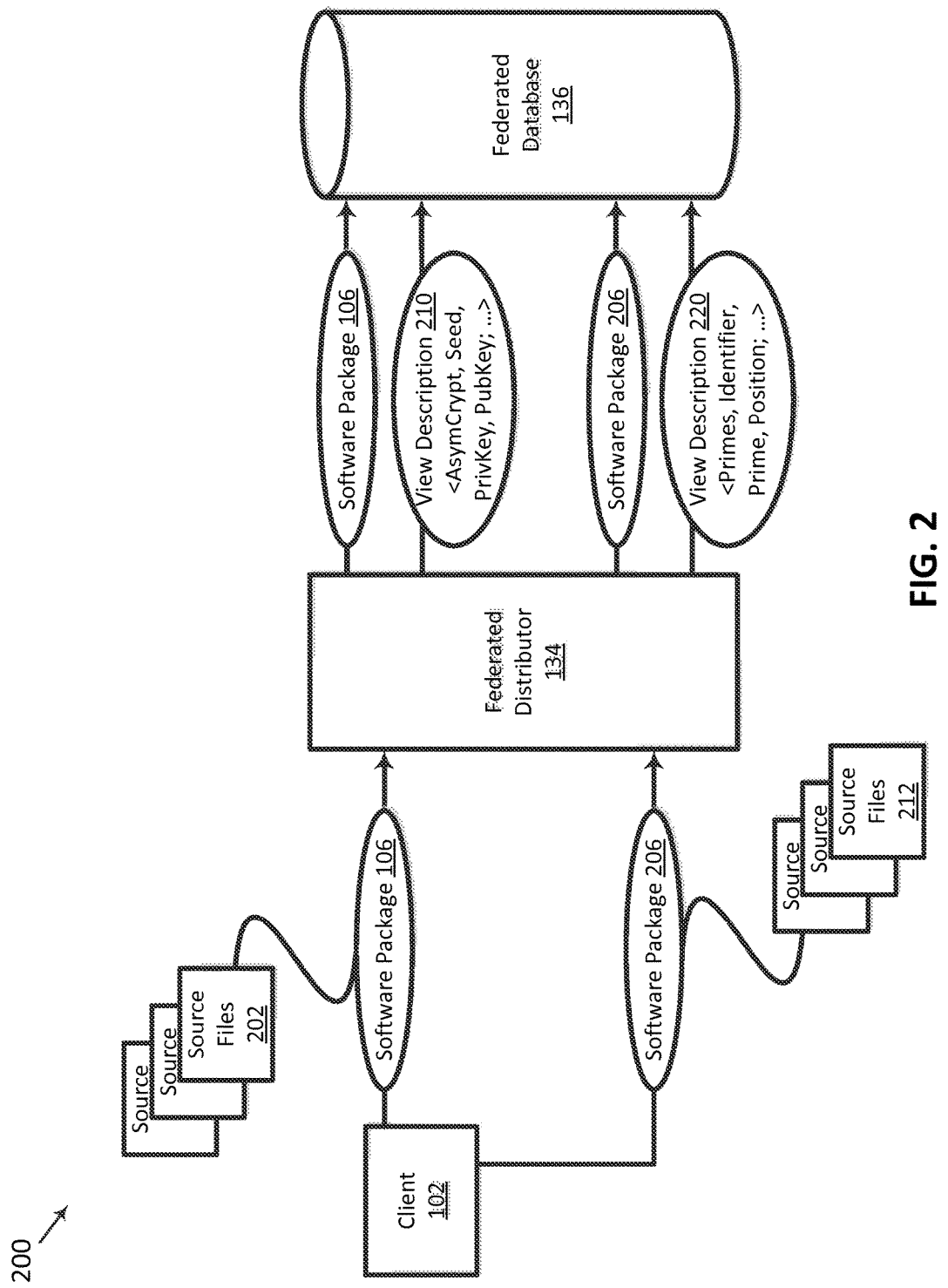
FIG. 2 is a block diagram illustrating a process flow for processing one or more software packages, according to some embodiments.

Client 102 may upload a software package 106 to data federation tool 130 for storage and processing. FIG. 2 is a block diagram 200 illustrating a process flow for processing one or more software packages, according to some embodiments. As illustrated in FIG. 2, client 102 may send one or more software packages to data federation tool 130 for storage and processing. Client 102 may send software package 106 to data federation tool 130 before, at the same time, or after client 102 sends software package 206 to data federation tool 130. Federated distributor 134 may receive software package 106, 206 and store the software packages in federated database 136. Software package 106 includes a set of source files 202 including instructions to perform one or more operations, and software package 206 includes a set of source files 212 including instructions to perform one or more operations. The set of source files is written in a high-level programming language (e.g., C++ or Java). The one or more operations may include a set of one or more input parameters and a set of one or more output parameters.

Storage of a software package is triggered by a user uploading, via a client, the software package to data federation tool 130. The uploaded software package may conform to a particular format that is expected by data federation tool 130. For example, data federation tool 130 may expect the parameters of the operations to be optional, the number of parameters to be upper bounded, and/or the results of the operation(s) to be written to a standard output (e.g., STD-OUT) in a comma-separated values format.

In some embodiments, federated distributor 134 receives software package 106 and stores it in federated database 136. Federated database 136 may also store a collection of view descriptions. An administrator may create a view description 210 and store it in federated database 136. A view description may be a description of a table view and may include an identifier of the table view (e.g., table view name) along with a set of column names in the table view. Each of the column names may be marked as an input column, which stores values that are used as inputs into an operation, or marked as an output column, which stores values that are outputs of the operation. A view description of a table view does not store the actual data that is in the table view but rather is a description of that particular table view. Additionally, a table view may be a virtual table including data that is simulated by a data slave and not stored on disk or a hardware drive. In contrast, an actual database table may be a table stored on disk or a hardware drive.

In an example, set of source files 202 includes instructions to generate public and private RSA keys, which may be assigned to users. The operation of generating public and private RSA keys has input and output parameters. In FIG. 2, view description 210 includes the name of the table view "AsymCrypt" and a set of column names in the table view. View description 210 does not store the actual data that is in the table view "AsymCrypt," but rather is a description of the data in the "AsymCrypt" table view. In particular, view description 210 specifies that the "AsymCrypt" table view contains columns "Seed," "PrivKey," and "PubKey."

In an example, the administrator creates view description 210 for a table view, names the table view "AsymCrypt," and specifies an input column "Seed" and output columns "PrivKey" and "PubKey" for the table view. The administrator may mark column "Seed" as an input column that stores input values of the public and private key generation operation, and mark columns "PrivKey" and "PubKey" as output columns that store output values of the public and private key generation operation.

In another example, federated distributor 134 parses set of source files 202 and identifies the input and output parameters of one or more functions in the set of source files. Set of source files 202 may include a set of input parameters including a string parameter "Seed," which represents a random seed that is used to generate the public and private RSA keys, and a set of output parameters including a string parameter "PrivKey," which represents the private key, and a string parameter "PubKey," which represents the public key. Federated distributor 134 may parse set of source files 202 and identify the parameter "Seed" as an input parameter of one or more functions in the set of source files and identify the parameters "PrivKey" and "PubKey" as output parameters of one or more functions in the set of source files. In this example, federated distributor 134 may determine that the "AsymCrypt" table view contains columns corresponding to each of these parameters (e.g., "Seed," "PrivKey," and "PubKey"), and mark the column "Seed" as an input column and mark the columns "PrivKey" and "PubKey" as output columns.

Federated distributor 134 may store an association between the "AsymCrypt" table view, federated distributor 134, and software package 106 such that data federation tool 130 knows that the "AsymCrypt" table view exists and corresponds to federated distributor 134. In an example, the administrator assigns the "AsymCrypt" table view to federated distributor 134. After the columns have been marked, the "AsymCrypt" table view may be used as though it were an actual database table stored on disk or a hardware drive. For example, federated distributor 134 may submit queries to the "AsymCrypt" table view (see federated table 402 FIG. 4) to retrieve data from the table view.

It should be understood that this is merely an example, and a set of source files may include instructions to perform different operations than that described. It should also be understood that a data slave may be seen as a data source in the context of a source query, and the role of a data slave may change depending on the source query. For example, if federated distributor 134 selects data slave 110 for generating the first 1000 prime numbers and then selects data slave 110 for generating public and private keys, data slave 110 takes on a different role for each of these source queries.

In another example, set of sources files 212 includes instructions to generate prime numbers. The operation of generating prime numbers has input and output parameters. In FIG. 2, view description 220 includes the name of the table view "Primes" and a set of column names in the table view. View description 220 does not store the actual data that is in the table view "Primes," but rather is a description of the data in the "Primes" table view. In particular, view description 220 specifies that the "Primes" table view contains columns "Identifier," "Prime," and "Position."

In an example, the administrator creates view description 220 for a table view, names the table view "Primes," and specifies an input column "Position" and output columns "Prime" and "Identifier" for the table view. The administrator may mark column "Position" as an input column that stores input values of the prime number generation operation, and mark columns "Prime" and "Identifier" as output columns that store output values of the prime number generation operation.

In another example, federated distributor 134 parses set of source files 212 and identifies the input and output parameters of one or more functions in the set of source files. Set of source files 202 may include a set of input parameters including an integer parameter "Position," which represents a quantity of prime numbers to generate, and a set of output parameters including an integer array parameter "Prime," which represents an array of length Position and stores the prime numbers, and a string parameter "Identifier," which identifies a prime number output. If the "Position" parameter is 1000, then 1000 prime numbers will be generated and stored in the "Prime" array. Federated distributor 134 may parse set of source files 212 and identify the parameter "Position" as an input parameter of one or more functions in the set of source files and identify the parameters "Prime" and "Identifier" as output parameters of one or more functions in the set of source files. In this example, federated distributor 134 may determine that the "Primes" table view contains columns corresponding to each of these parameters (e.g., "Position," "Prime," and "Identifier"), and mark the column "Position" as an input column and mark the columns "Prime" and "Identifier" as output columns.

Federated distributor 134 may store an association between the "Primes" table view, federated distributor 134, and software package 206 such that data federation tool 130 knows that the "Primes" table view exists and corresponds to federated distributor 134. In an example, the administrator assigns the "Primes" table view to federated distributor 134. After the columns have been marked, the "Primes" table view may be used as though it were an actual database table stored on disk or a hardware drive. For example, federated distributor 134 may submit queries to the "Primes" table view (see federated table 402 FIG. 4).

The result of a query may be computationally and/or temporally expensive. In such a situation, the administrator may decide that it would be more efficient to have a data slave generate the data for a table view and submit the query against the table view rather than to submit the query against an actual database table stored on disk or a hardware drive.

B. Federated Queries Having Embedded Source Queries

Referring back to FIG. 1, client 102 may submit federated query 108 to data federation tool 130. Data federation engine 132 receives a federated query from client 102, breaks down the federated query into a federated query plan, and submits the federated query plan to federated distributor 134 for processing. The federated query plan defines one or more tables, and each table is associated with one or more conditions for selecting data from the table. The table to which a query is submitted may be a table view (e.g., virtual table) that is not stored on disk or a hardware drive, or may be an actual database table that is stored on disk or a hardware drive.

Figure 3:
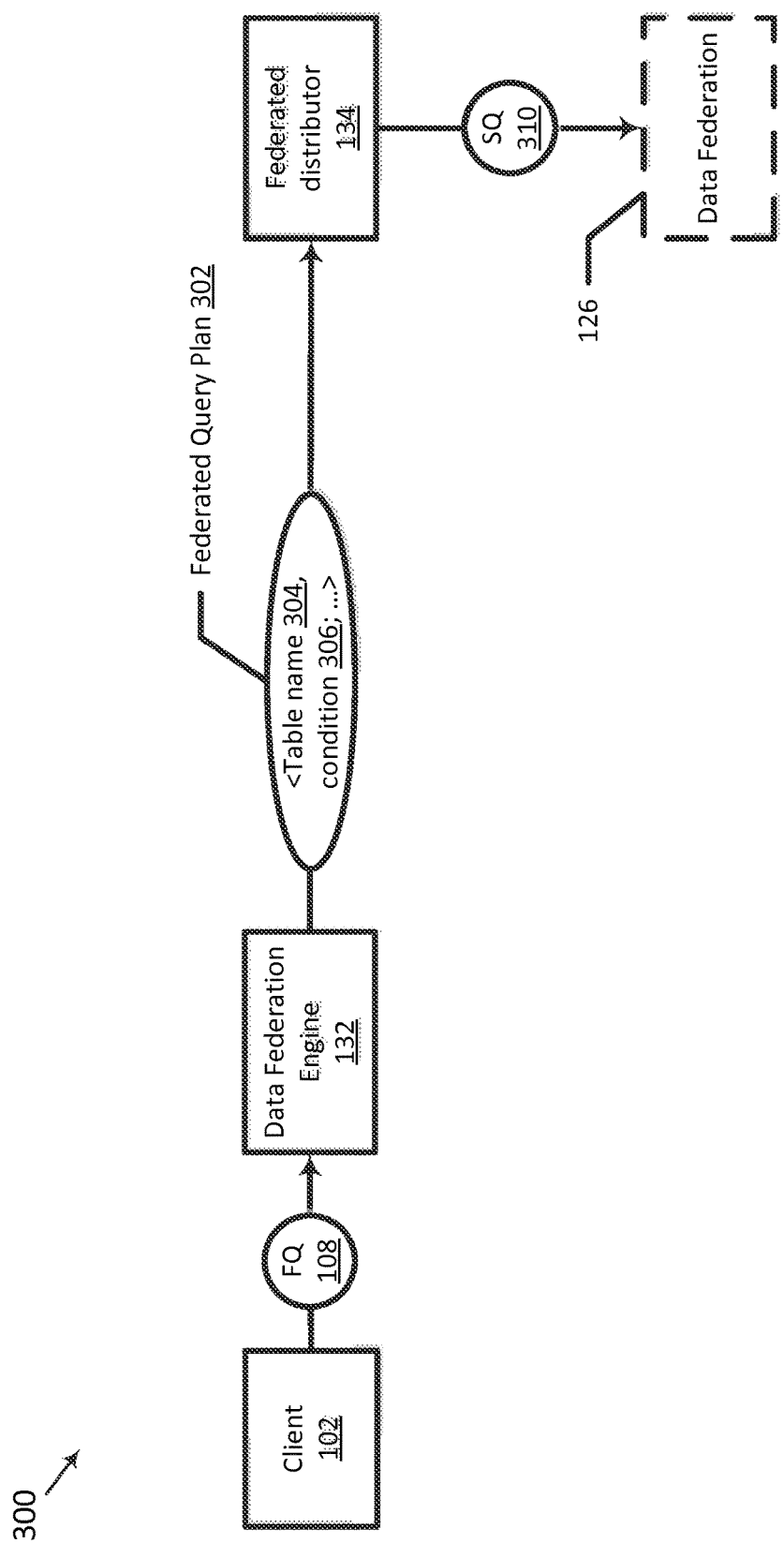
FIG. 3 is a block diagram illustrating a process flow for breaking down a federated query into a federated query plan, according to some embodiments.

FIG. 3 is a block diagram 300 illustrating a process flow for breaking down a federated query into a federated query plan, according to some embodiments. In FIG. 3, client 102 submits federated query 108 to data federation tool 130, and data federation engine 132 receives and processes federated query 108.

Table A provides an example of federated query 108.

TABLE A select * from Primes where Position < 1000

The federated query illustrated in Table A is an example and client 102 may submit more complicated queries (e.g., federated queries with joins to other data sources). In Table A, the example federated query includes the table name "Primes" and a condition "Position <1000."

Client 102 may submit federated query 108 to data federation tool 130 for processing without knowing where the data actually resides or how the data is actually generated. Using the techniques of the present disclosure, it may be unnecessary for client 102 to change the format of a conventional federated query. Thus, client 102 may submit a conventional federated query to data federation tool 130, which processes the federated query using improved techniques without concern about whether the table is a table view or an actual database table.

Data federation engine 132 parses the federated query and breaks it down into a federated query plan 302, which includes one or more table names 304 and one or more conditions 306 for each table name 304. To break down federated query 108 into federated query plan 302, data federation engine 132 identifies and extracts the table name "Primes" and the one or more conditions for the "Primes" table from federated query 108. Data federation engine 132 places the extracted data in the federated query plan.

Table B provides an example of federated query plan 302 based on the example federated query in Table A.

TABLE B

| Table name: 'Primes' | // example of table view name 304 |
| Condition for column Position: '< 1000' | // example of condition 306 |

The federated query plan illustrated in Table B is an example and may include more than one table name and more than one condition for each table name. The form of federated query plan 302 may be similar to a textual Structured Query Language (SQL) representation and is amenable to being parsed.

Data federation engine 132 sends the federated query plan to federated distributor 134 for processing. Federated distributor 134 handles the distribution of the processing of federated queries. For example, federated distributor 134 may obtain one or more federated query plans and send one or more source queries based on a federated query plan to a data source belonging to data federation 126 for processing. In FIG. 3, federated distributor 134 submits a source query 310, which is based on federated query plan 302, to a data source in data federation 126 to retrieve results of the source query. A source query may include a table name and one or more conditions for selecting data from the table identified by the table name. The source query is submitted to a data source that stores the actual database table identified by the table name or is submitted to a data source that generates data for the table view identified by the table name, as will be explained further below.

Table C provides an example of source query 310 based on the example federated query plan in Table B.

TABLE C select * from Primes where Position < 1000

The source query illustrated in Table C is embedded in the federated query in table A. For each identified table (e.g., table name) in the federated query plan (or for each embedded source query in the federated query), federated distributor 134 determines whether the table is associated with federated distributor 134. If the table is not associated with federated distributor 134, then the table may be an actual database table that is stored on disk or a hardware drive. In response to determining that the table is not associated with federated distributor 134, federated distributor 134 submits source query 310 to a data source belonging to data federation 126 for processing, where the data source stores the actual database table identified by the table name. In this example, the data source stores the actual database table "Primes" identified in the source query, which may be embedded in federated query 108 and based on federated query plan 302. Additionally, source query 310 includes the name of the actual database table "Primes" and the one or more conditions for selecting data from the table. In keeping with this example, federated distributor 134 may submit source query 310 to data source 115 belonging to data federation 126. Data source 115 may submit source query 310 against the table "Primes," retrieve a result of source query 310, and send the result to data federation engine 132, which will return the result to client 102.

In contrast, if the identified table (e.g., table name) in the federated query plan is associated with federated distributor 134, then the table may be a table view that is not stored on disk or a hardware drive. In response to determining that the table is associated with federated distributor 134, federated distributor 134 submits source query 310 to a data source belonging to data federation 126 for processing, where the data source is a data slave that generates on-the-fly data for the table view identified in source query 310 and submits source query 310 against the table view.

Figure 4:
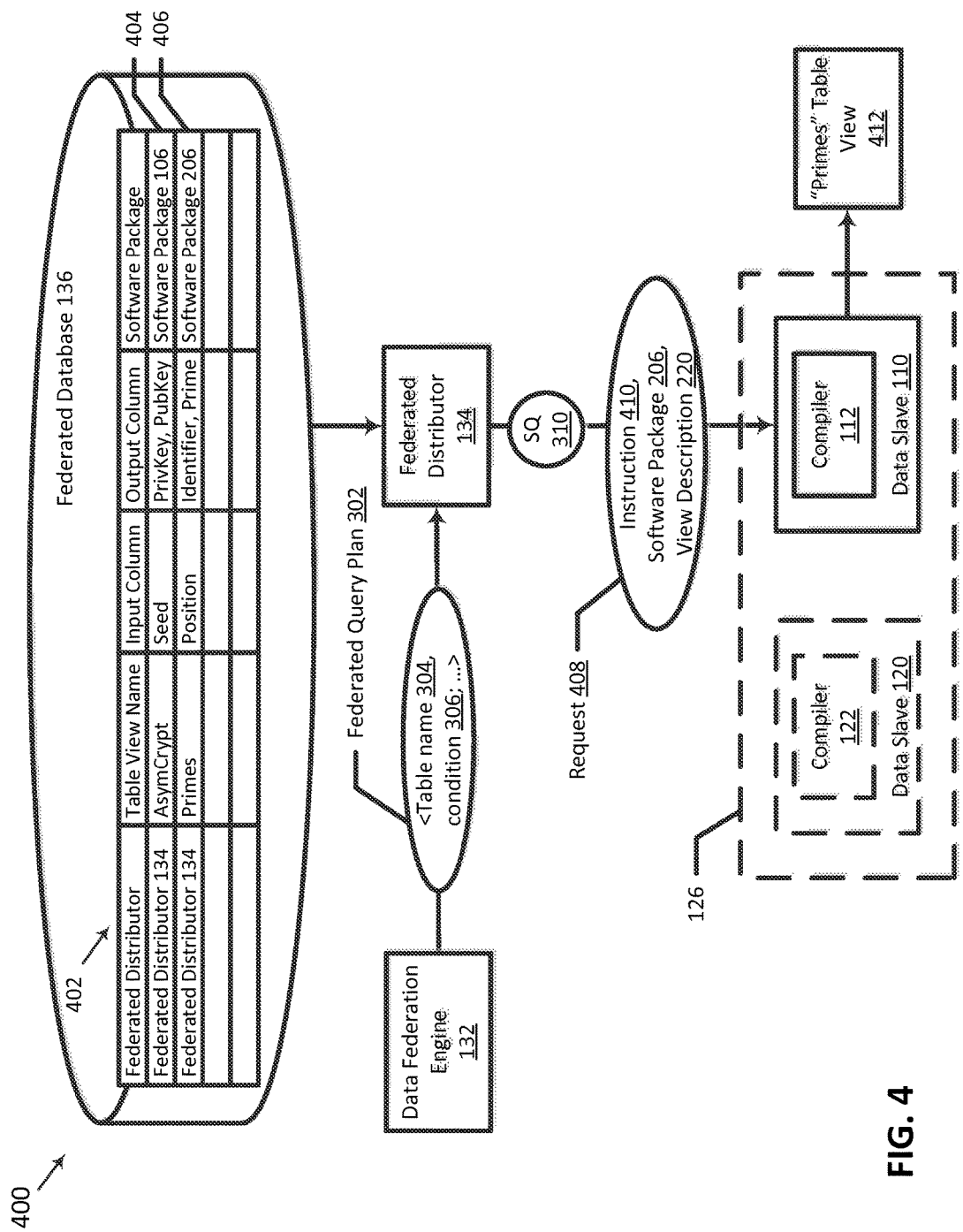
FIG. 4 is a block diagram illustrating a process flow for processing a source query that is submitted against a table view, according to some embodiments.

FIG. 4 is a block diagram 400 illustrating a process flow for processing a source query that is submitted against a table view, according to some embodiments. In FIG. 4, federated distributor 134 receives federated query plan 302, selects a data slave (e.g., data slave 110 or data slave 120), and submits a source query (embedded in federated query 108 and based on federated query plan 302) to the selected data slave for processing. Federated distributor 134 may select a data slave based on a variety of factors. In an example, federated distributor 134 selects the data slave that is closest to federated distributor 134 and is not being used. In another example, federated distributor 134 selects the data slave that has the lowest utilization rate. Other techniques to select a data slave are within the scope of the disclosure.

In FIG. 4, federated database 136 includes federated table 402 that stores an association between a federated distributor (e.g., federated distributor 134), a name of a table view, and a software package. In particular, an entry 404 stores an association between federated distributor 134, the "AsymCrypt" table view, and software package 106. In entry 404, the "Seed" column in the "AsymCrypt" table view is indicated as being an input column, and the "PrivKey" and "PubKey" columns in the "AsymCrypt" table view are indicated as being output columns. As such, entry 404 indicates that the "AsymCrypt" table is a table view and is associated with federated distributor 134 and software package 106.

An entry 406 stores an association between federated distributor 134, the "Primes" table view, and software package 206. In entry 406, the "Position" column in the "Primes" table view is indicated as being an input column, and the "Identifier" and "Prime" columns in the "Primes" table view are indicated as being output columns. As such, entry 406 indicates that the "Primes" table is a table view and is associated with federated distributor 134 and software package 206.

Referring to the example source query 310 in Table C, federated distributor 134 may read entry 406 and determine that the "Primes" table (identified in federated query plan 302 and the source query) is associated with federated distributor 134. If the identified table is associated with federated distributor 134, then the identified table is a table view. Federated distributor 134 may submit the source query to a data slave that generates data on-the-fly for the table view and submits the source query against the table view.

At least one source query embedded in federated query 108 may be submitted to a data slave that generates data on-the-fly. In an example, the data source is a data slave that generates data for the table view identified in source query 310, executes the source query against the table view, and retrieves results of the source query. In the example illustrated in FIG. 4, federated distributor 134 selects data slave 110 belonging to data federation 126 for processing source query 310 and deploys the software package on the selected data slave, where the software package is associated with the table identified in the source query. Federated distributor 134 may extract table name 304 ("Primes") and condition 306 ("Position <1000") for the table name 304 from federated query plan 302. Federated distributor 134 may deploy software package 206 on data slave 110 by, for example, sending a request 408 to data slave 110, where request 408 includes software package 206 associated with the "Primes" table view identified in federated query plan 302, view description 220 (which includes table name 304 (e.g., "Primes"), each condition 306 for table name 304), and an instruction 410 that causes data slave 110 to compile software package 206 in accordance with view description 220 of the table view "Primes."

Data slave 110 includes compiler 112, which compiles set of source files 212 in accordance with view description 220 of the "Primes" table view and generates data for the "Primes" table view. In an example, compiler 112 generates executable binary code by compiling set of source files 212 included in the software package and executes the binary code to generate prime numbers on-the-fly for the "Primes" table view. The "Primes" table view may include, for example, 5,000 prime numbers. In this way, the data slave may be a data source that generates data on-the-fly for the table view. Additionally, execution may be sped up because the source code may be more efficiently compiled by compiler 112 (rather than have data federation tool 130 compile all of the source code for each federated query).

Data slave 110 may receive source query 310, submit it against the "Primes" table view (which includes the data that was generated on-the-fly by data slave 1100, and retrieve the result of source query 310. In the example illustrated in Table C, data slave 110 may obtain the first 1000 prime numbers from the "Primes" table view. Data slave 110 may stream a result of source query 310 (e.g., the first 1000 prime numbers) to data federation engine 132. In some embodiments, data slave 110 retrieves a result of a source query and outputs the result to a standard output (e.g., stdoutput for a LINUX® operating system). Trademarks are the properties of their respective owners. By sending the data results to the standard output, the software code deployed on data slave 110 can redirect the result over the network back to data federation engine 132.

Data federation engine 132 may receive the result of the source query from a data slave in the same way as data federation engine 132 receives results from other data sources in data federation 126, where these data sources store the actual database tables queried against. Data federation engine 132 may stream the results from the one or more data sources to client 102.

As discussed above and further emphasized here, FIGS. 1-4 are merely examples, which should not unduly limit the scope of the claims. For example, it should be understood that one or more modules or components in FIG. 1 (e.g., data federation engine 132 and federated distributor 134) may be combined with another module or component. It should also be understood that one or more modules or components in FIG. 1 may be separated into more than one module or component. For example, data federation tool 130 may include more than one federated distributor (e.g., federated distributor 134A and federated distributor 134B). In this example, federated table 402 in FIG. 4 may specify with which federated distributor a particular software package or view description is associated.

Additionally, in FIG. 3, although instruction 410, software package 206, and view description 220 are illustrated as being included in one request or message, this is not intended to be limiting and each of instruction 410, software package 206, and view description 220 may be sent in a different request or message.

Moreover, although one source query is illustrated as being embedded in the federated query in Table A, this is not intended to limiting and more than one source query may be embedded in the federated query. Data federation engine 124 may identify a plurality of source queries embedded in federated query 108 and for each source query, select a data source to process the source query. In an example, federated query 108 may include a first source query "select * from Primes where Position <1000" (illustrated in Table Core) and a second source query "select * from AsymCrypt where Seed='xyz'"). Data federation tool 130 may perform similar actions for the second source query as discussed in relation to the first source query. Briefly, federated distributor 134 may determine that the "AsymCrypt" table view is associated with federated distributor 134 and select a data slave belonging to data federation 126 to generate the data for the "AsymCrypt" table view and to process the source query "select * from AsymCrypt where Seed='xyz'". The selected data slave may submit the received source query against the "AsymCrypt" table view and return a result of the source query to data federation engine 132, where the result would be private and public keys based on random seed "xyz." Data federation engine 132 may receive the result and send it to client 202.

III. Example Method

Figure 5:
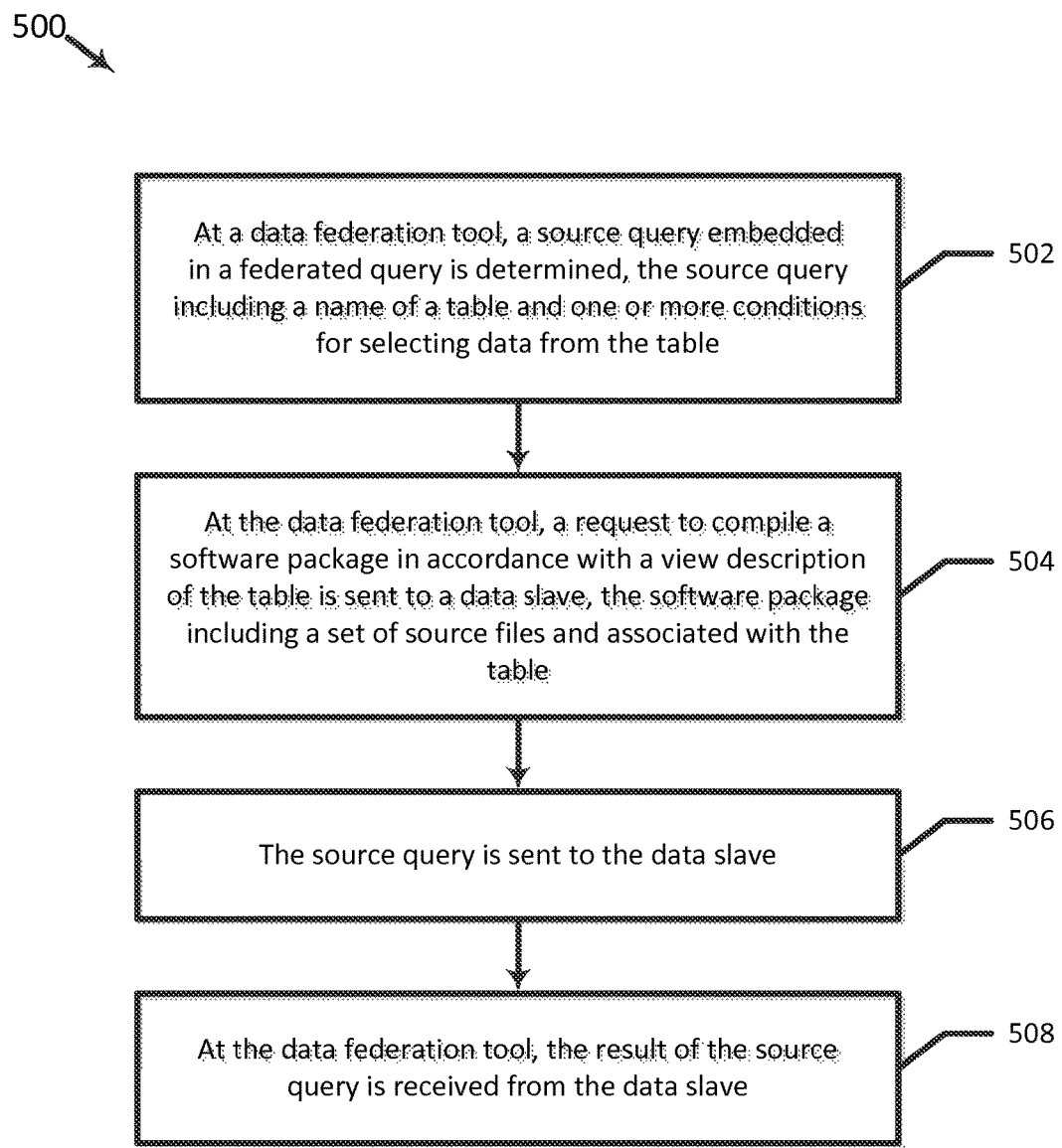
FIG. 5 is a flowchart illustrating a method of processing a federated query, according to some embodiments.

FIG. 5 is a flowchart illustrating a method 500 of processing a federated query, according to some embodiments. Method 500 is not meant to be limiting and may be used in other applications.

In FIG. 5, method 500 includes blocks 502-508. In a block 502, at a data federation tool, a source query embedded in a federated query is determined, the source query including a name of a table and one or more conditions for selecting data from the table. In an example, federated distributor 134 determines a source query embedded in federated query 108, the source query including a name of a table and one or more conditions for selecting data from the table.

In a block 504, at the data federation tool, a request to compile a software package in accordance with a view description of the table is sent to a data slave, the software package including a set of source files and associated with the table. In an example, federated distributor 134 sends request 408 to compile software package 106 in accordance with a view description of the table to data slave 110, software package 106 including a set of source files 202 and associated with the table.

In a block 506, the source query is sent to the data slave. In an example, federated distributor 134 sends source query 310 to data slave 110. In a block 508, at the data federation tool, the result of the source query is received from the data slave. In an example, data federation engine 132 receives the result of source query 310 from data slave 110.

In some embodiments, blocks 502-508 may be performed for any number of source queries embedded in a federated query. It is also understood that additional processes may be inserted before, during, or after blocks 502-508 discussed above. It is also understood that one or more of the blocks of method 500 described herein may be omitted, combined, or performed in a different sequence as desired.

IV. Example Computing System

Figure 6:
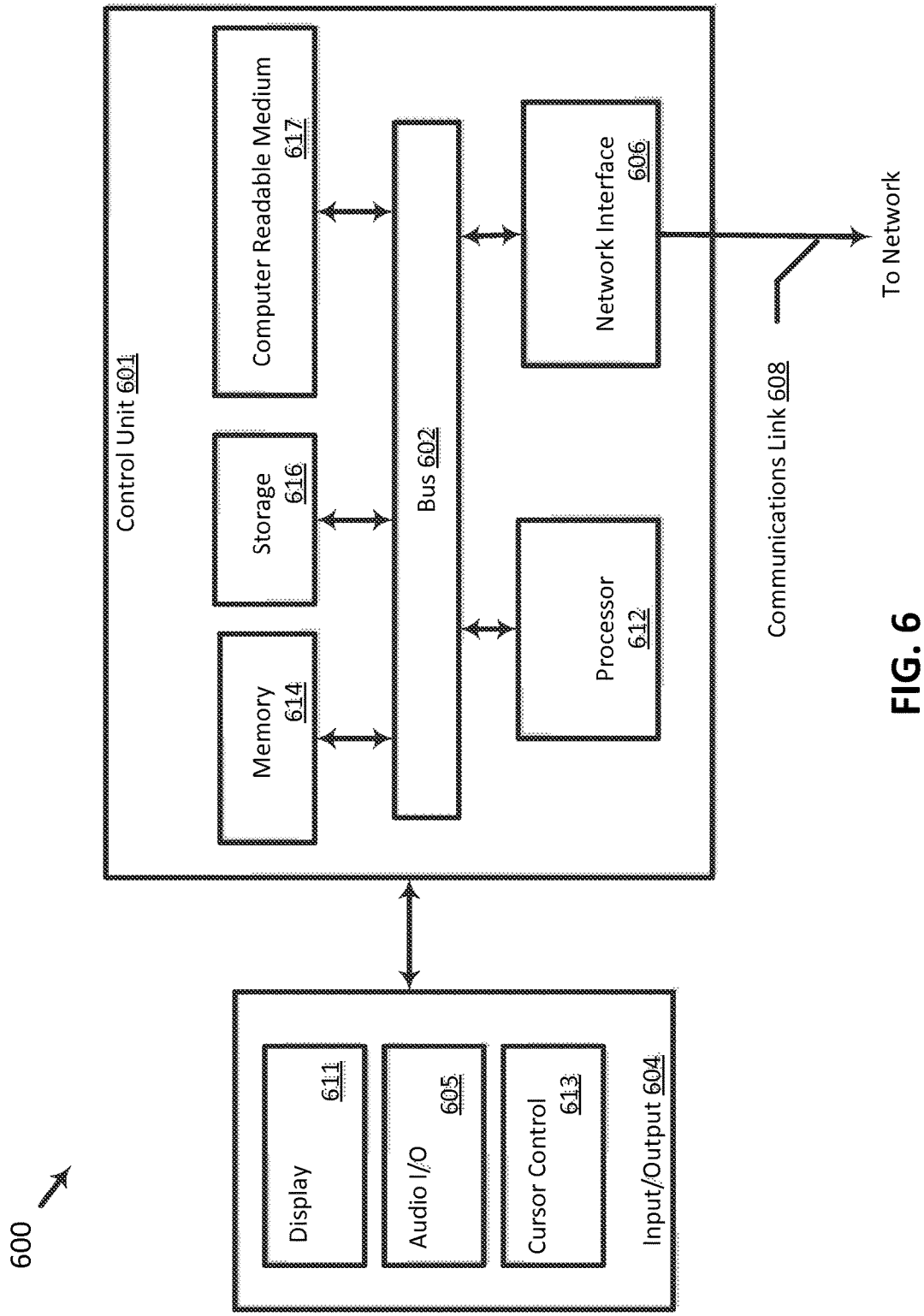
FIG. 6 is a block diagram of an electronic system suitable for implementing one or more embodiments of the present disclosure.

FIG. 6 is a block diagram of an example computer system 600 suitable for implementing any of the embodiments disclosed herein. In various implementations, data federation tool 130, data slave 110, data slave 120, data source 115, and data source 117 may implemented on be computer system 600. The computer system 600 may include one or more processors 612. The computer system 600 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to a client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 for processing user actions, such as selecting keys from a keypad/keyboard or selecting one or more buttons or links, etc., and send a corresponding signal to bus 602. I/O component 604 may also include an output component such as a display 611, and an input control such as a cursor control 613 (such as a keyboard, keypad, mouse, etc.).

An audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 618 to a network. In an embodiment, the transmission is wireless, although other transmission mediums and methods may also be suitable.

A processor 612, which may be a micro-controller, digital signal processor (DSP), or other processing component, processes these various signals, such as for display on display 611 of computer system 600 or transmission to other devices via communication link 618. A processor may also control transmission of information, such as cookies or IP addresses, to other devices.

Components of computer system 600 also include a system memory component 614 (e.g., RAM), a static storage component 616 (e.g., ROM), and/or a computer readable medium 617. Computer system 600 performs specific operations by one or more processors 612 and other components by executing one or more sequences of instructions contained in system memory component 614. Logic may be encoded in computer readable medium 617, which may refer to any medium that participates in providing instructions to one or more processors 612 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 614, and transmission media include coaxial cables, copper wire, and fiber optics, including wires that include bus 602. In an embodiment, the logic is encoded in non-transitory computer readable medium. Computer readable medium 617 may be any apparatus that can contain, store, communicate, propagate, or transport instructions that are used by or in connection with processor 612. Computer readable medium 617 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub- actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a query, comprising:
   receiving, at a data slave from a data federation tool, a source query including a name of a table and one or more conditions for selecting data from the table;
   compiling, at the data slave, a software package into executable binary code in accordance with a view description of the table, the software package including a set of source files including instructions to perform one or more operations, an operation having a set of inputs and a set of outputs, and the view description specifying a name of a table view and further specifying a set of input columns and a set of output columns of the table view;
   executing, at the data slave, the binary code to perform the one or more operations;
   generating, based on executing the binary code to perform the one or more operations, data for the table view corresponding to the table;
   associating at least some of the generated data with the set of output columns of the table view;
   submitting, at the data slave, the source query against the table view;
   retrieving, based on the data associated with the set of output columns, a result of the source query; and
   sending, at the data slave, the result of the source query to the data federation tool.

2. The method of claim 1, wherein the table is a table view.

3. The method of claim 1, wherein associating at least some of the generated data with the set of output columns of the table view includes storing the at least some of the data into the set of output columns of the table view.

4. The method of claim 1, further comprising:
   receiving, at the data slave, the software package and the view description; and
   creating the table view in accordance with the view description.

5. The method of claim 1, further comprising:
   determining, at the data federation tool, whether the table name is associated with a federated distributor; and
   in response to determining that the table name is associated with the federated distributor, sending a request and the source query to the data slave.

6. The method of claim 1, further comprising:
   storing an association between a federated distributor, the software package, and the table name.

7. A system for processing a query, comprising:
a data slave that receives, by one or more hardware processors, a source query from a data federation tool, the source query including a name of a table and one or more conditions for selecting data from the table,
wherein the data slave compiles a software package into executable binary code in accordance with a view description of the table, the software package including a set of source files including instructions to perform one or more operations, an operation having a set of inputs and a set of outputs, and the view description specifying a name of a table view and further specifying a set of input columns and a set of output columns of the table view,
wherein the data slave executes the binary code to perform the one or more operations, generates, based on execution of the binary code data for the table view corresponding to the table, associates at least some of the generated data with the set of output columns of the table view, submits the source query against the table view, retrieves, based on the data associated with the set of output columns, a result of the source query, and sends the result of the source query to the data federation tool.

8. The system of claim 7, wherein the data slave is remote from the federated distributor.

9. The system of claim 7, further comprising:
a federated database storing one or more associations between the federated distributor, a name of a table view, and a software package.

10. A non-transitory machine-readable medium comprising a plurality of machine-readable instructions that when executed by one or more processors is adapted to cause the one or more processors to perform a method comprising:
receiving, at a data slave from a data federation tool, a source query including a name of a table and one or more conditions for selecting data from the table;
compiling, at the data slave, a software package into executable binary code in accordance with a view description of the table, the software package including a set of source files including instructions to perform one or more operations, an operation having a set of inputs and a set of outputs, and the view description specifying a name of a table view and further specifying a set of input columns and a set of output columns of the table view;
executing, at the data slave, the binary code to perform the one or more operations;
generating, based on executing the binary code to perform the one or more operations the data for the table view corresponding to the table;
associating at least some of the generated data with the set of output columns of the table view;
submitting, at the data slave, the source query against the table view;
retrieving, based on the data associated with the set of output columns, a result of the source query; and
sending, at the data slave, the result of the source query to the data federation tool.

11. The method of claim 1, wherein the source query is part of a federated query.

12. The system of claim 7, further comprising:
a data federation engine that receives a federated query including one or more embedded source queries and receives a result of each of the one or more embedded source queries, wherein the one or more embedded source queries includes the source query.

13. The system of claim 12, further comprising:
a federated distributor that sends a request to the data slave to compile the software package in accordance with the view description of the table and sends the source query to the data slave.

14. The system of claim 13, wherein the federated distributor determines whether the table name is associated with the federated distributor and in response to determining that the table name is associated with the federated distributor, the federated distributor sends the request to the data slave to compile the software package in accordance with the view description of the table view and sends the source query to the data slave.

15. The system of claim 14, wherein in response to determining that the table name is not associated with the federated distributor, the federated distributor identifies a data source belonging to a data federation and sends the source query to the data source, wherein the data source stores the table, executes the source query against the table, and returns the result of the source query to the data federation tool.

16. The system of claim 7, wherein the data slave stores the generated data into the set of output columns of the table view and retrieves the result from the set of output columns of the table view.

* * * * *